June 9, 1925.  1,541,500

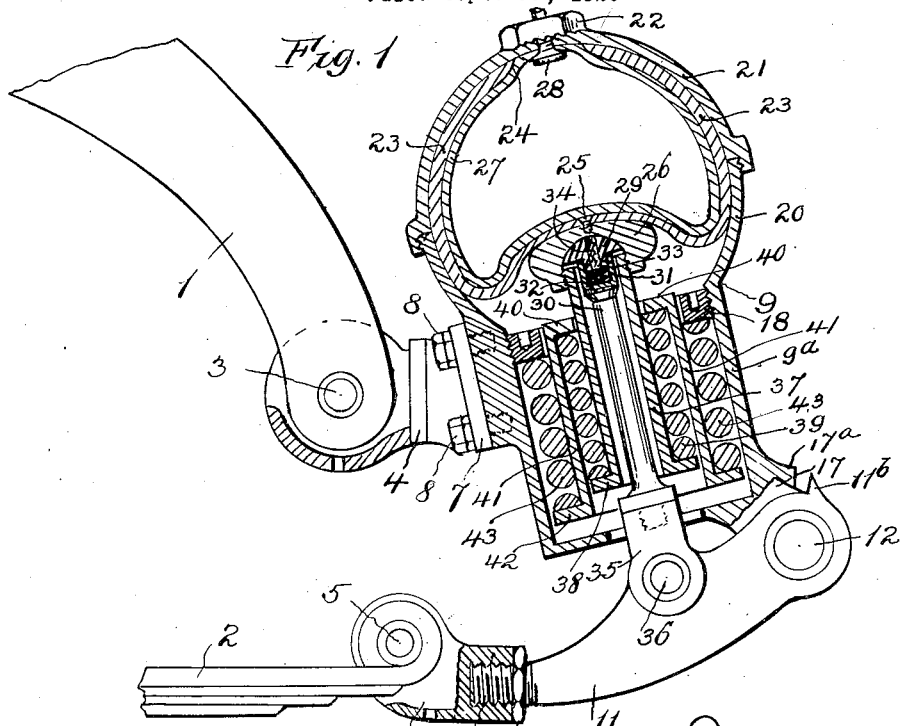

J. HOFMANN

SHOCK ABSORBER

Filed Sept. 13, 1920    3 Sheets-Sheet 2

Inventor
Josef Hofmann
by Henry Orth

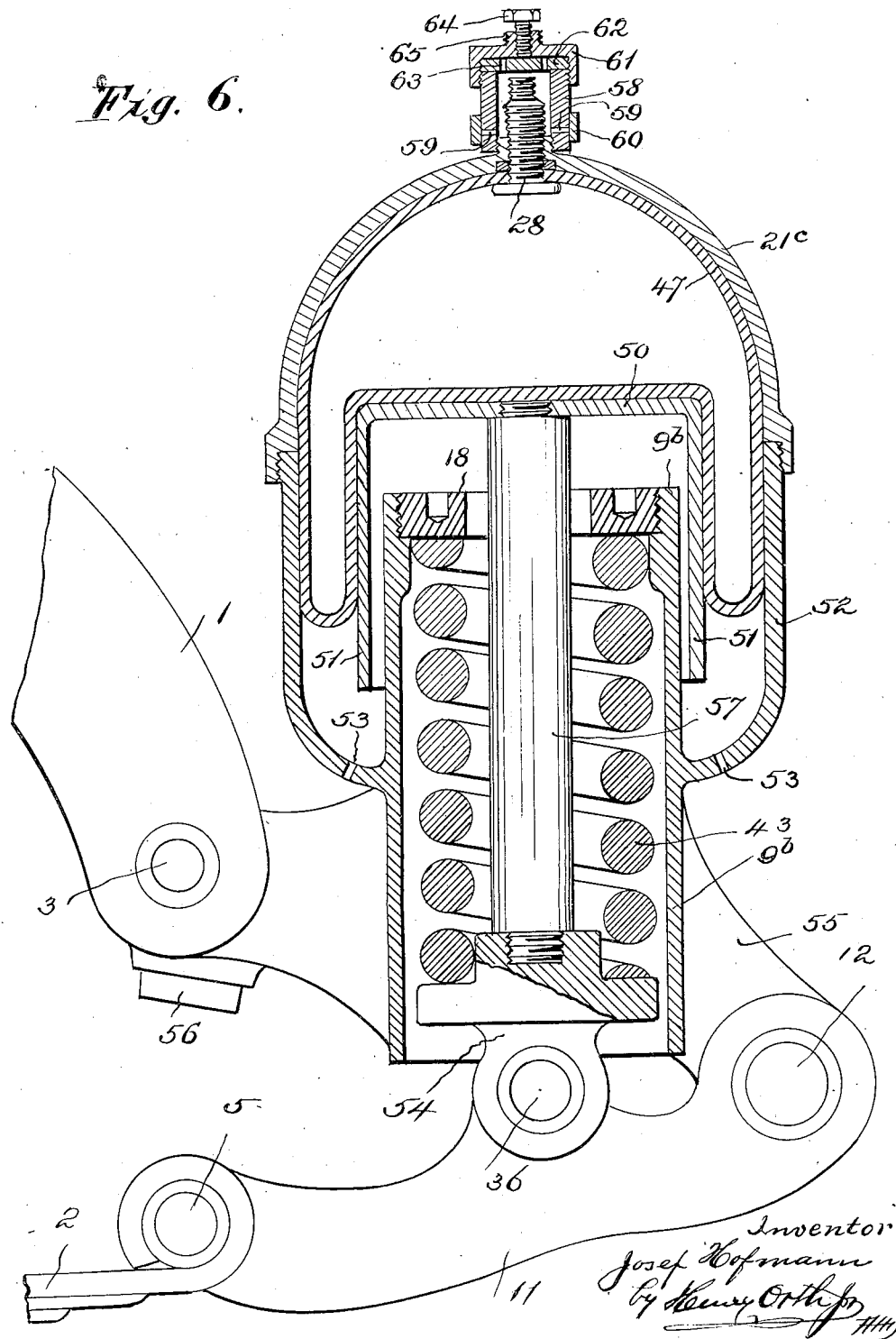

Patented June 9, 1925.

1,541,500

UNITED STATES PATENT OFFICE.

JOSEF HOFMANN, OF BAUMAROCHE, SWITZERLAND, ASSIGNOR TO ALFRED JOEL & CO., OF ZURICH, SWITZERLAND.

SHOCK ABSORBER.

Application filed September 13, 1920. Serial No. 409,938.

*To all whom it may concern:*

Be it known that I, JOSEF HOFMANN, of Baumaroche, Switzerland, a citizen of Poland, have invented certain new and useful Improvements in Shock Absorbers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to shock absorbers, and comprises two levers or their equivalent, one end of the levers being pivoted together, and the other ends of said levers being pivoted to the frame extension of the vehicle, and the body spring or other part of the running gear of the vehicle, respectively. Included between said lever members are springs arranged in tandem. The tandem arrangement may or may not include an air cushion device.

Referring to the drawings, in which like parts are similarly designated—

Figure 1 is a cross section of a shock absorber embodying my invention.

Fig. 2 is a bottom view.

Fig. 3 shows a modified form of construction of the air cushion illustrated in Fig. 1.

Fig. 6 shows another arrangement of an air spring combined with a single coil spring.

Figure 4:
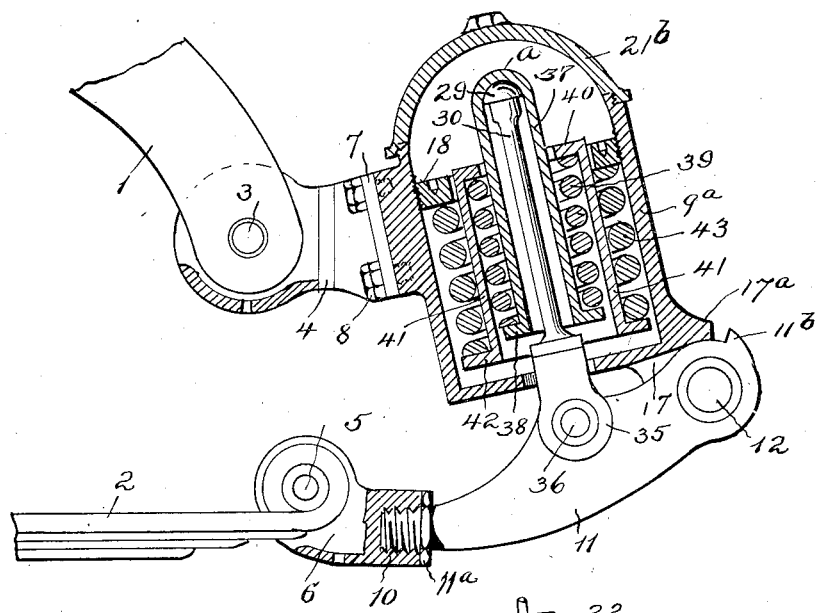
Fig. 4 is an arrangement with the air cushion omitted.

Referring now to Figs. 1 and 2, 1 indicates the frame extension, and 2 the body spring. Pivoted at 3 to the extension 1 is a connecting element 4, and pivoted to the spring at 5 is another connecting element 6. The elements 4 and 6 are constructed to fit different makes of vehicles, and to these elements the shock absorber, which is standard, is connected.

The element 4 has a flange 7 through which pass four bolts 8, (two of which are shown) that connect the element 4 to the spring containing casing or lever member 9. The element 6 is interiorly threaded for the reception of the threaded end 10 of one of the levers 11, the other lever being constituted by the casing 9. A lock-nut 11ª holds lever 11 tight. The casing 9 and lever 11 are pivoted together by a pin 12 having nut 13 at one end that is slotted, and locked by a cotter pin 14. A grease cup 15 is provided at the other end. The pin 12 is surrounded by a bushing 16.

The casing 9 has a lug extension 17 on a cylindrical portion 9ª through which the pivot pin 12 passes, and this lug has an abutment 17ª against which may strike a lug 11ᵇ on lever 11 in case of excessive shocks.

The casing 9 is interiorly threaded at its upper end for the reception of a threaded spring adjusting ring 18 that is provided with spaced holes for the reception of a spanner. Extending from the cylindrical portion is a semi-spherical portion 20 threaded at its upper end, onto which screws the semi-spherical removable cap portion 21 provided with a hexagonal or other shaped boss 22 for the reception of a wrench or spanner by which the cap may be removed. Within the spherical portion formed by the parts 20, and 21, is a fabric element 23 having a hole at its top at 24, and secured by a screw or other fastening 25 to a plunger 26. Through the hole 24 is inserted an inner rubber sack 27 provided with an inflating valve 28 that projects through the boss 22.

The plunger 26 seats on a spherical head 29 that is screwed into the upper end of plunger rod 30. This rod is enlarged at its upper end 31, and has an oil receiving chamber 32 formed therein, in which is placed a light coil spring 33 that urges a wick 34 against the surface of plunger head 26.

The plunger rod 30 is screwed into a pivotal connection 35 through which passes a pivot pin 36 that connects the plunger rod to lever 11 between its ends.

The plunger head 26 is secured to one end of a tube 37 surrounding the rod 30, and has a flange 38 at its other end. The under face of the spherical head 29 is slightly spaced from the end of the plunger tube 37, in order to permit slight universal movement of the spherical head with respect to the plunger head.

Surrounding the tube 37 and abutting at one end against a spring supporting flange 38 is a coil spring 39 whose other end abuts against an inwardly directed flange 40 on one end of a tube 41 that has at its other end an outwardly directed flange 42.

Surrounding the tube 41 and abutting against its outwardly directed flange 42 is a second coil spring 43 whose other end abuts against the adjusting ring 18. The two springs 39 and 43 are of substantially the same strength, but by reason of the larger diameter of the spring 43 it must be made of heavier wire.

The operation is as follows:—

Upon the movement of the two lever members together the plunger rod 30 moves the plunger head 26 to compress the air cushion, and at the same time moves the tube 37 along with it and compresses spring 39, which in turn acts on flange 40 to also move tube 41 to compress spring 43 against the adjustable ring 18. Upon the reverse movement the parts assume normal position, and may pass this position with decreasing oscillations.

In the modification shown in Fig. 3 I have illustrated the portion 20ª of the cylinder 9ª as being provided with a clincher bead 44 for holding a fabric diaphragm 45, over which is placed a rubber disc 46 whose edges are cemented to the edges of a rubber sack 47. The spherical portion 21 has an off-set 48 under which the edges of the sack and disc are clamped as the portion 21ª is screwed tightly to the portion 20ª. The portion 21 has a cylindrical portion 21ª that confines the diaphragm against the bead 44, and at the centre of the diaphragm is a block or pin 49 that enters a recess in the plunger.

By this arrangement the construction of the pneumatic cushion is simplified.

The extent of movement of the air cushion by reason of the use of the coil springs is kept small to make it possible to increase the ratio of leverage and yet carry a heavier load without an excessive air-pressure, and consequently there will be no folding of the fabric around the plunger head in pronounced folds.

In Fig. 4 I have illustrated two springs in tandem, both of them being coil springs, and the construction is substantially the same as that of Fig. 1 with the air spring or cushion omitted. To this end the plunger tube 37 is closed at its upper end at $a$ and the plunger head 29 seats in this spherical closed end. A screw cap 21ᵇ covers the end of the cylindrical casing 9ª.

Figure 5:
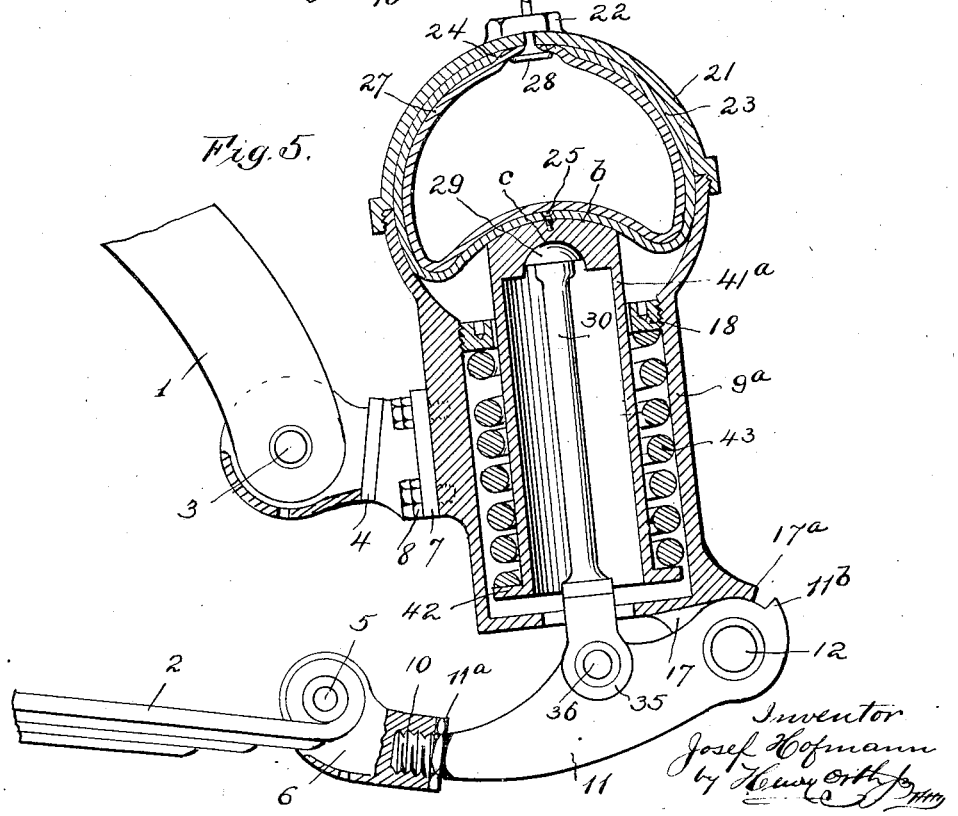
Fig. 5 shows an air spring and single coil spring in tandem.

In Fig. 5 I have also shown two springs in tandem, one of them being a coil spring 43 and the other an air spring or cushion similar to the air spring shown in Fig. 1.

In this construction the coil spring 39 of Fig. 1 is omitted, and the outer movable tube 41ª is extended and closed at its upper end, there being formed thereon a spherical outer surface $b$ contacting with the diaphragm or outer pneumatic fabric sack 23, a screw 25 or its equivalent securing the two elements together. The inner surface $c$ of this tube forms a spherical seat for the plunger head 29. In other respects the construction is similar to that shown in Figure 1.

The operation of the devices shown in Figs. 4 and 5 is similar to the operation described with reference to Fig. 1.

In the construction shown in Fig. 6 the air sack of pure rubber is unsupported by fabric layers of the type used for the manufacture of outer pneumatic tires, and this rubber sack rests on a plunger head 50 having a depending cylindrical apron 51 that is free to move over the upper end of the cylinder 9ᵇ which is spaced from a casing portion 52 to permit the sack to readily fold and accommodate itself to the various levels of the plunger head. The portion 52 is provided with one or more air vents 53.

The upper end of the cylinder is provided with a removable ring 18, as before, forming an abutment for the upper end of the coil spring 43 whose lower end is supported on the connection 54 pivoted to the lever 11 at 36. This connection has screwed to it the lower end of the plunger rod 57, the upper end of which is screwed into the plunger head 50.

The lever 11 is pivoted at 12 to an extension 55 on the cylinder casing 9ᵇ. A rubber buffer 56 is placed in the path of the end of lever 11.

The cover cap 21ᶜ is provided with the usual opening for the inflating valve 28 and has screwed to it a cylinder 58 having vents 59 covered by an expansible ring 60 of rubber or equivalent, and this cylinder is closed by a cap 61, seating on a rubber washer 62 having vents 63. A screw 64 is used to force the washer into close contact with the upper end of valve 28, rendering the valve leak proof. The ring 60 prevents over inflation.

To inflate, remove plug 64 and connect the pump to the nipple 65. Air passes through vents 63 into the chamber surrounding the upper end of the valve 28 and then passes through the valve into the sack 47; when sufficient air pressure has been produced in the sack, any excess pressure will cause ring 60 to open the vents 59.

In this construction the elasticity of the pure rubber sack is added to the resiliency of the air cushion and the coil spring or springs.

It is, of course, obvious that I may use in connection with this type of air cushion one or more coil springs, as illustrated in Figs. 1, 3 and 4.

It will be noted that in all the figures the amplitude of movement of the springs is less than the amplitude of the movement of the body spring eye, that is to say, the shock absorbing springs are under geared, their ratio of amplitude to that of the spring eye being less than one to one.

I have found by doing this that the life of the air bag of the pneumatic cushion or the sack is more than doubled, and that by this means the life of the air bag is in the majority of cases extended to the life of the car.

It will also be noted that the coil spring takes considerable of the load off the air cushion.

I claim:

1. In a shock absorber, two levers pivoted together, an air cushion and a coil spring between them, the leverage or amplitude of movement at said cushion and spring is less than the ratio of one to one compared to the points of connection of said levers to the vehicle body and body spring.

2. In a shock absorber, two levers pivoted together, a plurality of tandem coil springs and an air cushion in tandem therewith all included between said levers.

3. In a shock absorber, two levers pivoted together, a plunger rod pivoted to one of the levers and an air cushion device at the end of said plunger rod, and coil springs co-operating in tandem with said air cushion.

4. In a shock absorber, two levers pivoted together, a plunger rod pivoted to one of said levers and the other of said levers constituting a casing for an air cushion, a plunger at the end of said rod for the air cushion, a tube secured to said plunger and having a spring support thereon springs arranged to act in tandem against said support and surrounding said tube and a second support for said springs in said casing.

5. In a shock absorber, two levers pivoted together, a plunger rod pivoted to one of said levers, and the other lever comprising a casing for an air cushion, a plunger for the air cushion having a spherical seat, a spherical head on the plunger engaging said seat, a tube secured to the plunger having a spring supporting flange, a second tube having an inwardly directed flange, a spring included between said flanges, an outwardly directed flange on the second tube, an adjusting ring in the casing and a second spring included between the latter flange and ring.

6. In a shock absorber for connection between a vehicle body member and the vehicle body spring member; a casing arranged for attachment to one of said members, an air cushion and a coil spring operating in tandem in said casing, a lever pivoted at one end to the casing and a plunger pivotally connected to said lever and operating to simultaneously compress the air cushion and coil spring upon relative movement of the casing and lever, said lever arranged for connection at its other end to the other member.

7. In a shock absorber, a casing comprising a tubular portion having a clinching bead thereon, a diaphragm arranged to clinch over said bead and a cover containing an inflatable sack secured to said diaphragm, said cover having a screw connection with said tubular portion and holding said diaphragm clinched in said bead and also having an off-set for holding said sack and diaphragm in peripheral engagement.

8. In a shock absorber, a plunger rod having a chambered end for the reception of oil, a head having an oiling device passing therethrough and a plunger having universal movement on said head, and a pneumatic cushion connected to said plunger.

9. In a shock absorber, a plunger rod having a chambered end for the reception of oil, a spherical head secured in said chamber and having a passage therethrough, a wick in said passage, a spring for supporting said wick, a plunger having slight universal movement on said head and an inflatable air sack acted upon by said plunger.

10. In a shock absorber, two levers pivoted together, a rod pivoted to one of said levers, a spring support connected to said rod, a tubular member concentric with said rod and having an inwardly directed flange, a coil spring between said flange and support, said member also having an outwardly directed flange, supporting means on the other member, and a second coil spring included between said supporting means and outwardly directed flange.

11. In a shock absorber, two levers pivoted together at one end, a spring carried by one lever, a plunger rod pivoted on the other lever, a spherical head mounted on the end of the plunger rod, and means for supporting said spring and forming a spherical seat for said head.

12. In a shock absorber, two levers pivoted together at their ends, a plunger rod pivoted to one lever between its ends, a tube surrounding said rod and having means providing a bearing on the end of said rod, a spring on the rod, and a second spring operated by the reciprocating movement of said tube and rod.

13. In a shock absorber, a casing, a lever pivoted thereto, a plunger rod pivoted to said lever, a plunger on said rod, an inflatable extensible rubber sack in said casing acted upon by said plunger, and a coil spring included between the plunger rod and casing.

14. In a shock absorber, a casing, a lever pivoted thereto, an air cushion in said casing, a steel spring, and a plunger pivoted to said lever, said plunger operating said steel spring and air cushion in parallel when said lever and casing move relatively.

In testimony that I claim the foregoing as my invention, I have signed my name hereto.

JOSEF HOFMANN.